United States Patent [19]
Nadan et al.

[11] Patent Number: 5,720,801
[45] Date of Patent: Feb. 24, 1998

[54] WATER RESISTANT SECURITY INK COMPOSITION

[76] Inventors: Wendy Nadan, 38 McGivern St., Moorefield, Ontario; John E. Kibbee, 21 Grand Ridge Crescent, Guelph, Ontario, both of Canada, N1H 8G1; Thomas R. Oswald, 164 Hennepin Rd., Grand Island, N.Y. 14072

[21] Appl. No.: 744,935

[22] Filed: Nov. 6, 1996

[51] Int. Cl.$^6$ .................................................. C09D 11/00
[52] U.S. Cl. ........................ 106/31.16; 106/31.14; 106/31.41; 106/31.43; 106/31.73; 106/31.75; 283/72
[58] Field of Search ........................ 106/31.14, 31.16, 106/31.41, 31.43, 31.73, 31.75; 283/72

[56] References Cited

U.S. PATENT DOCUMENTS

| | | |
|---|---|---|
| 1,839,995 | 1/1932 | Remick . |
| 1,911,774 | 5/1933 | Smith . |
| 2,767,154 | 10/1956 | Weihe . |
| 3,802,724 | 4/1974 | Gosnell . |
| 3,870,841 | 3/1975 | Makowski et al. . |
| 3,876,496 | 4/1975 | Lozano . |
| 4,037,007 | 7/1977 | Wood . |
| 4,043,820 | 8/1977 | Landau . |
| 4,170,578 | 10/1979 | Schelhaas . |
| 4,171,982 | 10/1979 | Lin . |
| 4,227,719 | 10/1980 | McElligott et al. . |
| 4,478,681 | 10/1984 | Müller et al. . |
| 4,540,628 | 9/1985 | Oberdeck et al. . |
| 4,710,617 | 12/1987 | Mouchotte . |
| 5,058,925 | 10/1991 | Dotson . |
| 5,085,925 | 2/1992 | Hiraoka et al. . |
| 5,196,243 | 3/1993 | Kawashima . |
| 5,304,587 | 4/1994 | Oswald et al. . |

FOREIGN PATENT DOCUMENTS

| | | |
|---|---|---|
| 530025 | 6/1983 | Australia . |
| 0044378 | 1/1982 | European Pat. Off. . |
| 62-000568 | 1/1987 | Japan . |
| 0336237 | 9/1930 | United Kingdom . |
| 2094820 | 9/1982 | United Kingdom . |

OTHER PUBLICATIONS

Chemical Abstracts, vol. 93, No. 22, Jun. 17, 1980, Oji paper Co., Ltd., Abekawa Paper Co., Ltd.; Abstract No. 206440, "Paper for Preventing Forgery", p. 104, col. 1.

Abstract–Derwent Publications Ltd., AN 74–33529; JP-A-49 005 047 (Ricoh Co. Ltd.) Jan. 17, 1974.

Apr. 7, 1993 Communication from European Patent Office, EP 92 310687.6, Search Report and Annex to Search Report.

Polymer & General Chemistry Abstract, vol. 76, No.12, Mar. 1976, Adeka Argus Chem. Co. Ltd., Abstract No. J7 60–08133, "Polyolefin Resin Compen."

*Primary Examiner*—Deborah Jones
*Attorney, Agent, or Firm*—Finnegan Henderson Farabow

[57] ABSTRACT

A leach resistant ink composition including a diphenyl guanidine compound, an acid, and a resin. The ink composition may further include a glycol and an alcohol and can be printed on paper, such as, for example, in the word "VOID". If bleach is used to attempt to alter the document, the initially colorless ink will form a colored image in the shapes or letters printed on the paper. The ink composition is resistant to leaching upon contact with, for example, water. The presence of the acid enables the security composition to be invisible by preventing or minimizing undesirable reactions with chemically sensitive paper.

34 Claims, No Drawings

WATER RESISTANT SECURITY INK COMPOSITION

BACKGROUND OF THE INVENTION

1. Field of Invention

This invention relates to a leach resistant ink composition. In particular, the invention relates to a leach resistant ink composition useful as a security ink, i.e., for application to a document to prevent alteration of information on the document.

2. Description of The Prior Art

CHLOROSTAIN-based security inks are initially colorless inks that are applied to a document, such as, for example, in the form of the word "VOID". If bleach or some other oxidizing agent is used in an attempt to alter the document, the colorless ink typically forms a colored image.

CHLOROSTAIN-based security inks suffer from the problem that unimaged CHLOROSTAIN can be easily washed out with water. Some government jurisdictions have required that CHLOROSTAIN security features be resistant to contact with water in the unimaged state for up to one hour.

The use of benzothiazole compounds such as CHLOROSTAIN OR (Mobay Corp. Pittsburgh, Pa.) in ink compositions to prevent document alteration is known. For example, U.S. Pat. No. 4,227,719 to McElligott et al. discloses a CHLOROSTAIN OR-based security ink. The ink disclosed by McElligott et al., however, like other known CHLOROSTAIN-based security inks, suffers from the problem that the ink is not water resistant and can be washed out upon contact with water.

A security ink using N,N-diphenyl guanidine (Tradename: CHLOROSTAIN BR, by Mobay Corp.) has been disclosed that provides improved water resistance. U.S. Pat. No. 5,304,587 to Oswald et al. and U.S. Pat. No. 5,085,925 to Dotson disclose leach resistant security inks that include CHLOROSTAIN BR.

The security ink disclosed by the Dotson patent suffers from several drawbacks. The Dotson ink composition requires the use of a complexing agent, such as glucose, sucrose, sorbitol and the like, to provide resistance to leaching. The ink disclosed in Dotson further requires the use of a separate fixing agent and fixing step to bind the ink composition to the document substrate. The separate fixing step requires either two passes through a printing or coating head or two units on the press or coater for this ink alone while the ink of the present invention only requires one print station. Moreover, the two step Dotson operation will either limit the other printing that can be done in one pass or will raise the cost if another printing or coating unit is added or if the paper is run through twice.

In addition, the present inventors have found that the composition disclosed by the Oswald et al. patent (sold commercially as ALTERGUARD®, available from Moore Business Forms, Inc., Grand Island, N.Y.), when used with certain chemically sensitive papers, may not be initially colorless. The composition may react with the chemically sensitive paper, thus making the security image such as "VOID" visible prior to any attempted alteration.

Accordingly, there is a need for a stable security ink composition that can be applied to a document to prevent unauthorized alteration of the document by the use of one or more oxidizing agents.

There is also a need for a security ink composition that is initially colorless but changes color upon contact with an oxidizing agent.

There is also a need for a security ink composition that is resistant to leaching by water or other means.

There is further a need for a security ink composition that does not require the use of a complexing agent.

There is a further need for a document protected against alteration by use of a security ink composition, which composition can be applied to the document without a fixing agent or a fixing step.

There is a further need for a security ink composition containing a diphenyl guanidine compound that can be applied to chemically sensitive papers without initially forming a visible image.

SUMMARY OF THE INVENTION

To achieve the advantages and in accordance with the purpose of the invention, as embodied and broadly described herein, a leach resistant ink composition is provided. The composition includes a resin, a diphenyl guanidine compound, and an acid. The composition is initially colorless but is capable of exhibiting color upon contact with an oxidizing agent and is capable of resisting leaching in the absence of a complexing agent for the diphenyl guanidine compound.

The present invention, in another aspect, provides a leach resistant ink composition comprising a resin, a diphenyl guanidine compound, an acid, a glycol, and an alcohol. The composition is initially colorless but is capable of exhibiting color upon contact with an oxidizing agent and is capable of resisting leaching in the absence of a complexing agent for the diphenyl guanidine compound.

The invention provides, in yet another aspect, a document resistant to alteration by an oxidizing agent. The document comprises a substrate and the ink composition of the present invention.

The leach resistant ink of the present invention is particularly useful as a security feature on documents where it is important that any attempts at alteration be exposed. The colorless ink of the present invention can be printed on paper, for example in the word "VOID." When bleach is used to attempt to alter the document, the colorless ink of the present invention will form a colored image in the shapes or letters printed on the paper. The presence of the acid in the ink composition of the invention prevents premature formation of an image on certain chemically sensitive paper.

Additional objects and advantages of the invention will be set forth in part in the description which follows, and in part will be obvious from the description, or may be learned by practice of the invention. The objects and advantages of the invention can be realized and attained by means of the elements and combinations particularly pointed out in the appended claims.

DESCRIPTION OF THE PREFERRED EMBODIMENTS

In accordance with the invention, as embodied and broadly described herein, the ink composition of the present invention can be printed on a substrate in a manner so that, upon attempt to alter the substrate, the initially colorless ink of the present invention will form a colored image in the shapes or letters printed on the paper. As used herein, the term "colorless" is not meant to designate total absence of color but, rather, a substantial lack of color.

In accordance with the present invention, suitable substrates include paper or paperboard and may be made from natural or synthetic materials, such as films, fabrics, foils, natural and synthetic papers and other media. Preferred substrates are natural fiber papers where enhanced security is needed. These may include light and heavy weight papers, coated paper, and security paper.

The ink composition of the invention is particularly advantageous for use with chemically sensitive substrates that contain security dyes, which have a tendency to react with the diphenyl guanidine component to undesirably form a premature image on the substrate. Such chemically sensitive substrates include certain papers such as SECURITY GATE (available from Boise Cascade, Boise, Id.), CONSERVATOR (available from Moore Business Forms, Grand Island, N.Y.), SENTRY SECURITY (available from Spring Hill, Purchase, N.Y.), CHEQUE 1053 (available from Domtar, Montreal, Quebec), and security paper available from Arjo Wiggins, Greenwich, Conn.

The ink composition of the invention overcomes the problem of premature image formation by inclusion of a small amount of an acid, such as acetic acid, citric acid, oleic acid, hydrochloric acid, and sulfuric acid. While not wishing to be bound by any theory, the present inventors believe that the acid buffers or neutralizes the alkaline diphenyl guanidine component, thus enabling the security image to be invisible prior to attempted alteration.

In accordance with the invention, as embodied and broadly described herein, the ink composition may be coated over the entire surface of the document substrate or may be coated on selected portions thereof. The ink may be coated in a pattern of tamper indicated indicia, for example, in the word "VOID" or may be coated on the surface of the substrate in a continuous film.

In accordance with one embodiment of the invention, as embodied and broadly described herein, the security ink composition of the invention comprises a resin, an acid, and a diphenyl guanidine compound. This composition provides a security feature in that it becomes colored upon contact with an oxidizing agent and, additionally, is resistant to being leached out from a substrate by water or other solvents.

In accordance with the invention, as embodied and broadly described herein, the acid is present in an amount sufficient to neutralize the diphenyl guanidine to prevent activation of certain dyes contained on chemically sensitive substrates, such as security paper. This amount may range from about 0.5% to about 20% by weight, depending on the particular acid used, based on the total weight of the composition. Preferred acids include acetic acid, citric acid, oleic acid, hydrochloric acid, and sulfuric acid. A particularly preferred acid is acetic acid, which is preferably present in an amount ranging from about 1% to about 5% by weight.

In accordance with the invention, the resin can be selected from typical ink formulating resins, including acrylic and acrylic copolymer resins and emulsions, epoxy resins, melamine-formaldehyde resins, polyvinyl acetates, phenolic modified resins, glycerol esters of synthetic resins, phenolic-modified pentaerythritol esters of synthetic resins, etc. One particularly preferred resin is FILTREZ 550, available from Akzo Coatings, Inc., Baxley, Ga. FILTREZ 550 is a rosin modified phenolic condensate polymer. Another preferred resin is JONCRYL 67 (produced by S. C. Johnson & Sons, Racine, Wis.). JONCRYL 67 is a styrene acrylic polymer resin. The resin is preferably present in an amount ranging from about 1% to about 24% by weight, and more preferably in an amount ranging from about 8% to about 15% by weight based upon the final composition.

A preferred diphenyl guanidine compound for use according to the present invention is the compound N,N-diphenyl guanidine, which is believed to be the active component in CHLOROSTAIN BR. The diphenyl guanidine is preferably present in an amount ranging from about 1% to about 30% by weight based upon the final composition, more preferably an amount ranging from about 5% to about 30% by weight.

In accordance with a preferred embodiment of the invention, the ink composition of the invention also includes an alcohol solvent and a glycol. Alcohols useful in the ink composition of the present invention as solvents include those alcohols that readily evaporate at temperatures ranging from about 20° to about 100° C. and thus do not trigger the security dyes in chemically sensitive paper. Examples include, but are not limited to, methyl alcohol, isopropyl alcohol, n-propyl alcohol, ethyl alcohol, and tridecyl alcohol. Methyl alcohol and isopropyl alcohol are preferred. The alcohol is preferably present in an amount ranging from about 40% to about 80% by weight based upon the final composition. Glycols useful in the ink composition of the invention include, but are not limited to, diethylene glycol and propylene glycol. The glycol is preferably present in an amount ranging from greater than 0% to about 5% by weight, based on the total weight of the composition, more preferably about 1% to about 4% by weight. The purpose of the glycol is to minimize or prevent premature drying of the ink composition on printing equipment.

In accordance with another embodiment of the invention, as embodied and broadly described herein, the ink composition may further include a benzothiazole compound. The preferred benzothiazole compound useful in the ink composition of the present invention is CHLOROSTAIN OR. The benzothiazole compound is preferably present in an amount ranging from about 1% to about 45% by weight based upon the final composition, more preferably in an amount ranging from about 1% to about 15% by weight.

The ink composition of the invention may optionally also include a glycol ether compound. Glycol ether compounds useful in the ink composition of the present invention include ethylene and propylene based glycol ethers and glycol ether esters. Preferably, the glycol ether compound is selected from methyl cellosolve and methyl carbitol. More preferably, the glycol ether compound is methyl carbitol. The glycol ether compound may be present in an amount ranging from about 1% to about 59% by weight based upon the final composition, more preferably about 3% to about 7%.

The ink composition according to the present invention can be printed onto a document substrate using printing methods known in the art. Among the preferred methods of printing are flexographic and gravure printing.

Once the ink composition has been printed onto the substrate, no additional fixing step is necessary to bind the ink to the substrate. The composition of the invention resists leaching by techniques such as soaking in water, etc. Upon an attempt at alteration of information on the document, for example by contact with bleach, the colorless ink composition will form a colored composition indicating the tampering.

A preferred ink composition according to the present invention comprises about 1% to about 5% by weight of a glycol,
about 40% to about 70% by weight methanol,
about 8% to about 15% by weight resin,
about 1% to about 5% by weight acetic acid,
greater than 0% to about 15% by weight CHLOROSTAIN OR, and about 5% to about 30% by weight CHLOROSTAIN BR, each based on the total weight of the composition.

In a preferred embodiment of the invention, both CHLOROSTAIN OR and CHLOROSTAIN BR are used. CHLOROSTAIN OR is more easily washed out but develops a color rapidly. CHLOROSTAIN BR is resistant to leachout but is slower to develop color. Thus, by varying the relative proportions of CHLOROSTAIN OR and CHLOROSTAIN BR present in the composition, the overall ink properties can be selectively controlled to achieve the desired results.

The following examples are illustrative of the invention embodied herein but are not intended to be limiting in any way.

EXAMPLE 1

| Ingredient | grams | % by weight |
| --- | --- | --- |
| Methanol | 354 | 56.2 |
| FILTREZ 550 resin | 72 | 11.4 |
| CHLOROSTAIN BR | 162 | 25.7 |
| Propylene Glycol | 12 | 1.9 |
| Acetic Acid | 30 | 4.8 |
| TOTAL | 630 | 100 |

The above ingredients were stirred to dissolve. The solution was printed onto chemically sensitive security paper using a handheld proof press. This ink was colorless when printed onto the paper and was resistant to water leaching.

EXAMPLE 2

| Ingredient | grams | % by weight |
| --- | --- | --- |
| Methanol | 354 | 54.6 |
| FILTREZ 550 resin | 72 | 11.1 |
| CHLOROSTAIN BR | 162 | 25.0 |
| Propylene Glycol | 12 | 1.9 |
| Citric Acid | 48 | 7.4 |
| TOTAL | 648 | 100 |

The above ingredients were stirred to dissolve. The solution was printed onto chemically sensitive security paper using a handheld proof press. This ink was colorless when printed onto the paper and was resistant to water leaching.

EXAMPLE 3

| Ingredient | grams | % by weight |
| --- | --- | --- |
| Methanol | 354 | 49.2 |
| FILTREZ 550 resin | 72 | 10.0 |
| CHLOROSTAIN BR | 162 | 22.5 |
| Propylene Glycol | 12 | 1.7 |
| Oleic Acid | 120 | 16.7 |
| TOTAL | 720 | 100 |

The above ingredients were stirred to dissolve. The solution was printed onto chemically sensitive security paper using a handheld proof press. This ink was colorless when printed onto the paper and was resistant to water leaching.

EXAMPLE 4

| Ingredient | grams | % by weight |
| --- | --- | --- |
| Methanol | 57.5 | 58.6 |
| JONCRYL 67 resin | 11.7 | 11.9 |
| CHLOROSTAIN BR | 14.6 | 14.9 |
| CHLOROSTAIN OR | 11.7 | 11.9 |
| Sulfuric Acid | 2.6 | 2.7 |
| TOTAL | 98.1 | 100 |

The above ingredients were stirred to dissolve. The solution was printed onto chemically sensitive security paper using a handheld proof press. This ink was colorless when printed onto the paper and was resistant to water leaching.

Comparative Example 1

| Ingredient | grams | % by weight |
| --- | --- | --- |
| Methanol | 354 | 59.0 |
| FILTREZ 550 resin | 72 | 12.0 |
| CHLOROSTAIN BR | 162 | 27.0 |
| Propylene Glycol | 12 | 2.0 |
| TOTAL | 600 | 100 |

The above ingredients were stirred to dissolve. The solution was printed onto chemically sensitive security paper using a handheld proof press. The chemical agents in the paper reacted with the ink and produced a blue color. The ink was resistant to water leaching.

Comparative Example 2

| Ingredient | grams | % by weight |
| --- | --- | --- |
| Methanol | 59 | 60.2 |
| JONCRYL 67 resin | 12 | 12.2 |
| CHLOROSTAIN BR | 15 | 15.3 |
| CHLOROSTAIN OR | 12 | 12.2 |
| TOTAL | 98 | 100 |

The above ingredients were stirred to dissolve. The solution was printed onto chemically sensitive security paper using a handheld proof press. The chemical agents in the paper reacted with the ink and produced a blue color. The ink was resistant to water leaching.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

What is claimed is:

1. A leach resistant ink composition comprising a resin, a diphenyl guanidine compound, and an acid, said composition being initially colorless but capable of exhibiting color upon contact with an oxidizing agent and being capable of resisting leaching in the absence of a complexing agent for said diphenyl guanidine compound.

2. The leach resistant ink composition according to claim 1, wherein said resin is a phenolic condensate polymer.

3. The leach resistant ink composition according to claim 1, wherein said resin is present in an amount ranging from about 8% to about 15% by weight, and said diphenyl guanidine compound is present in an amount ranging from about 5% to about 30% by weight, based on the total weight of the composition.

4. The leach resistant ink composition according to claim 1, further comprising a benzothiazole compound.

5. The leach resistant ink composition according to claim 4, wherein said benzothiazole compound is present in an amount ranging from greater than 0% to about 15% by weight, based on the total weight of the composition.

6. The leach resistant ink composition according to claim 2, wherein said resin is a rosin modified phenolic condensate polymer.

7. The leach resistant ink composition according to claim 1, wherein said diphenyl guanidine compound is N,N-diphenyl guanidine.

8. The leach resistant ink composition according to claim 1, wherein said acid is selected from acetic acid, citric acid, oleic acid, hydrochloric acid, and sulfuric acid.

9. The leach resistant ink composition according to claim 8, wherein said acid is present in an amount ranging from about 0.5% to about 20% by weight, based on the total weight of the composition.

10. The leach resistant ink composition according to claim 8, wherein said acid is acetic acid.

11. The leach resistant ink composition according to claim 10, wherein said acid is present in an amount ranging from about 1% to about 5% by weight, based on the total weight of the composition.

12. The leach resistant ink composition according to claim 1, further comprising an alcohol.

13. The leach resistant ink composition according to claim 12, wherein said alcohol is present in an amount ranging from about 40% to about 80% by weight, based on the total weight of the composition.

14. The leach resistant ink composition according to claim 12, wherein said alcohol is selected from methyl alcohol and isopropyl alcohol.

15. The leach resistant ink composition according to claim 1, further comprising a glycol.

16. The leach resistant ink composition according to claim 15, wherein said glycol is present in an amount ranging from greater than 0% to about 5% by weight, based on the total weight of the composition.

17. The leach resistant ink composition according to claim 16, wherein said glycol is selected from propylene glycol and diethylene glycol.

18. A document resistant to alteration comprising a substrate and a leach resistant ink composition applied thereto, said ink composition comprising diphenyl guanidine, a resin, and an acid, and said ink composition being initially colorless but capable of exhibiting color upon contact with an oxidizing agent and being capable of resisting leaching in the absence of a complexing agent for said diphenyl guanidine compound.

19. The document of claim 18, wherein said resin is a phenolic condensate polymer.

20. The document according to claim 19, wherein said resin is a rosin modified phenolic condensate polymer.

21. The document according to claim 18, wherein said resin is present in an amount ranging from about 8% to about 15% by weight, and said diphenyl guanidine compound is present in an amount ranging from about 5% to about 30% by weight, based on the total weight of the composition.

22. The document according to claim 18, wherein the ink composition further comprises a benzothiazole compound.

23. The document according to claim 22, wherein said benzothiazole compound is present in an amount ranging from greater than 0% to about 15% by weight, based on the total weight of the composition.

24. The document according to claim 18, further comprising a glycol.

25. The document according to claim 24, wherein said glycol is present in an amount ranging from greater than 0% to about 5% by weight, based on the total weight of the composition.

26. The document according to claim 24, wherein said glycol is selected from propylene glycol and diethylene glycol.

27. The document according to claim 18, further comprising an alcohol.

28. The document according to claim 27, wherein said alcohol is present in an amount ranging from about 40% to about 80% by weight, based on the total weight of the composition.

29. The document according to claim 28, wherein said alcohol is selected from methyl alcohol and isopropyl alcohol.

30. The document according to claim 18, wherein said acid is selected from acetic acid, citric acid, oleic acid, hydrochloric acid, and sulfuric acid.

31. The document according to claim 30, wherein said acid is present in an amount ranging from about 0.5% to about 20% by weight, based on the total weight of the composition.

32. The document according to claim 30, wherein said acid is acetic acid.

33. The document according to claim 32, wherein said acid is present in an amount ranging from about 1% to about 5% by weight, based on the total weight of the composition.

34. The document according to claim 18, wherein said diphenyl guanidine is N,N-diphenyl guanidine.

* * * * *